May 11, 1943.    C. H. SCOTT    2,318,638
VALVE
Filed March 10, 1942    2 Sheets-Sheet 1

INVENTOR
CHARLES H. SCOTT,
BY
Arthur Middleton
ATTORNEY.

May 11, 1943. C. H. SCOTT 2,318,638
VALVE
Filed March 10, 1942 2 Sheets-Sheet 2

INVENTOR
CHARLES H. SCOTT,
BY
ATTORNEY.

Patented May 11, 1943

2,318,638

UNITED STATES PATENT OFFICE 2,318,638

VALVE

Charles H. Scott, Westport, Conn., assignor to The Dorr Company, Inc., New York, N. Y., a corporation of Delaware Application March 10, 1942, Serial No. 434,053

6 Claims. (Cl. 251—91)

This invention relates to improvements in valves, particularly valves to be used in handling the flow of media that tends to congest, such as sludges, pulps, slurries and other mixtures of solids and liquids, or of suspensions of solids in liquids.

It is among the objects of this invention to provide valve means that are compact, simple and inexpensive, and whereby potential points of congestion in the valve itself and in the connections thereof are made readily accessible for cleaning, so that congestions whether they occur in the connection at the one or the other side of the valve, or in the valve itself may be readily overcome.

To this end the valve according to this invention is so constructed and accessible in such a manner for cleaning purposes, that it permits a congestion that may occur either at the inlet or at the outlet side of the valve, to be attended to and removed independently and without the need of additional shut-off means in the pipe connections of the valve. This is a plug type valve which is open when a port in the plug registers with the inlet and with the outlet connection of the valve. However, the plug can be turned to a special "clean out" position which exposes the port along with the inlet connection of the valve for convenient cleaning, while closing the outlet connection. Similarly, the plug can be turned to another clean out position which exposes the port and the outlet connection of the valve while closing the inlet connection.

According to one feature, this plug type valve has its inlet and outlet connection disposed at substantially right angles with respect to one another, and it is therefore herein termed an angle valve. In one position of the plug, the port therein will register with the inlet connection at one end as well as with the clean out passage in the valve housing in the opposite end in such a manner as to permit introducing from the outside a cleaning element such as a rod through the clean out passage and the port into the inlet connection, while the plug at the same time keeps the outlet connection closed. Correspondingly, in another clean out position of the plug, the port registers in a similar manner and for a similar purpose with the outlet connection at one end and with a clean out port at the opposite end thereof, while the inlet connection is closed. The clean out passages, however, are closed by the plug in the normal open and closed operating positions thereof.

According to another feature, the aforementioned clean out positions of the plug will also establish registry of the port with a compressed air or pressure water connection on the valve housing, so that the inlet connection can be blown out with compressed air or high pressure water while the outlet connection is closed by the plug, or vice versa the outlet connection be blown out from the same compressed air or water connection, while the inlet connection is closed by the plug.

As illustrative of a form of construction by which the invention hereof may be realized, reference is made to the accompanying drawings constituting a part of this specification, and in which drawings:

Fig. 5 is a similar cross-section of the valve, showing the valve plug in the one clean-out position, while

Figure 1:
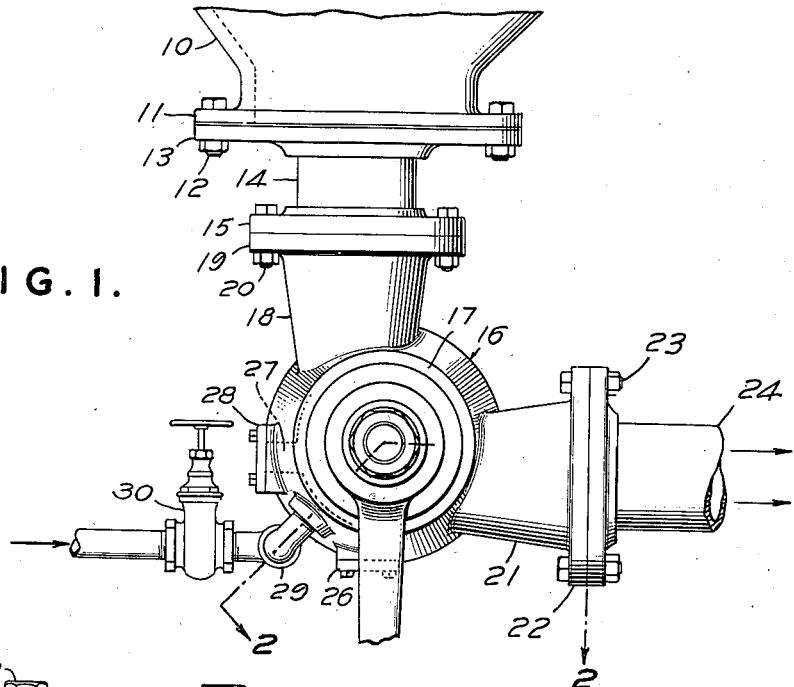
Fig. 1 is a front view of the valve mounted in place.
Figure 2:
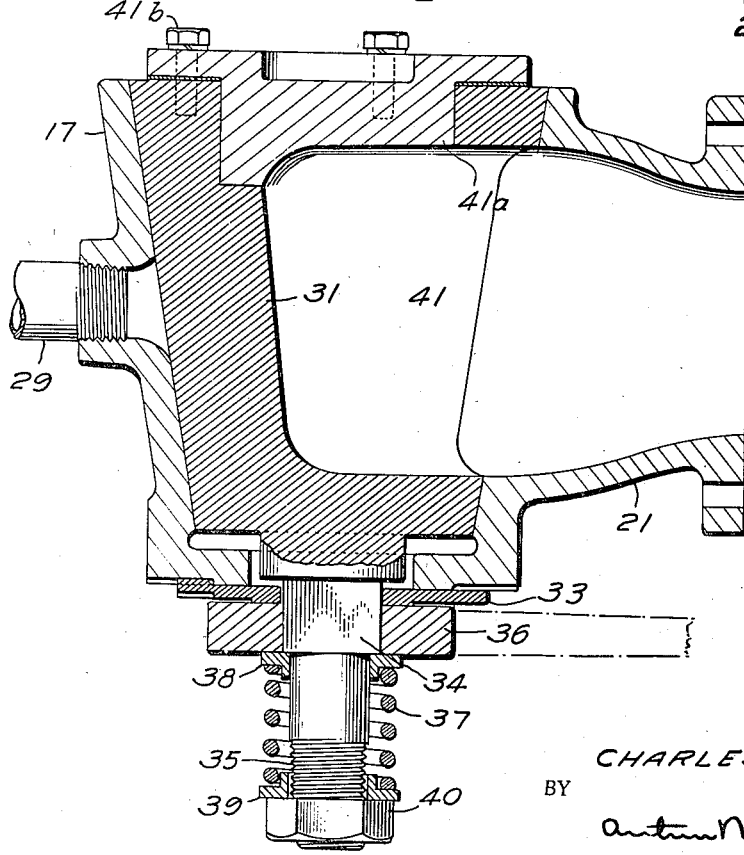
Fig. 2 is an enlarged section of the valve taken upon the line 2—2 in Fig. 1.

A useful application of this invention is shown in Fig. 1, where the valve is installed at the outlet which is a part of the bottom of a thickener, through which outlet sludge or sediment from the thickening process is discharged. In Fig. 1 the sludge outlet portion of the thickener bottom is indicated by the numeral 10, having a bottom flange 11 to which is bolted as at 12 a flange 13 which is part of a reduction connection 14, which in turn has a lower end flange 15.

The valve unit proper is collectively designated by the numeral 16, and it comprises a body portion or valve housing 17 having an inlet connection 18 extending upwardly and provided with a flange 19 that is bolted as at 20 to the flange 15. The body portion 17 of the valve furthermore has an outlet connection 21 extending laterally from the housing, namely, at substantially right angles to the inlet connection 18, and it has a flange 22 to which is bolted as at 23 a sludge discharge pipe 24.

The valve housing 17 furthermore has an opening 25 opposite to the inlet connection 18, and shown to be provided with a removable cover 28. Intermediate the two openings 25 and 27 the valve housing 17 is provided with a pipe connection 29 for supplying compressed air, and having a shut-off valve 30.

In the valve housing is seated a rotatable conical valve plug 31, the narrow end of which terminates in a stem portion 32 surrounded by a washer 33. The foot of the stem portion is formed as a square portion 34 over which fits an actuating lever 35. The stem portion has a round threaded end portion 36 surrounded by a compression coil spring 37 which is confined between washers 38 and 39 and held in place by a nut 40 by means of which the degree of compression of the coil spring 37 is adjustable. In this way the actuating lever 35 is held in place upon the square portion 34 and the plug 31 in turn is held in place upon its conical seat in the valve housing 17 with the required pressure.

The valve plug 17 has a port or passage 41 which can be positioned, by turning the plug, so as to close or open the valve, or so as to establish one clean-out position in which the inlet connection of the valve is closed while the outlet connection is accessible for cleaning through the port, or another clean-out position in which the outlet connection of the valve is closed while the inlet connection is made accessible for cleaning through the port. The interior of the valve plug 17 is accessible without removing the plug from its seat, since the port 41 can be inspected and cleaned by removing a cover 41a that closes the hollow interior of the plug and is fastened thereon as by bolts 41b. The cover 41a may be removed for inspection and cleanout of the port 41 when the plug 17 is in the valve closing (Fig. 3) position.

Figure 3:
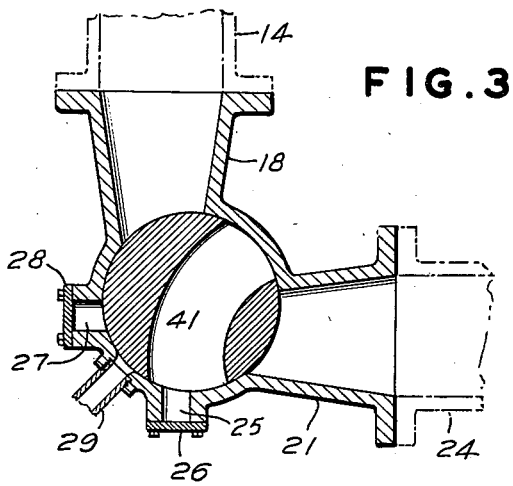
Fig. 3 is a cross-section of the valve when closed.

In the Fig. 3 position of the plug 31 the port 41 is out of registry with the inlet and the outlet connection, both these connections being shut-off by the body of the plug 17, that is the valve is closed. However, a turn of the plug counter-clockwise through a relatively short arc will bring the port 41 into registry with the inlet connection 18 at one end and the outlet connection 21 at the other end, in which condition the valve is open, see Fig. 4, while the openings 25 and 27, as well as the compressed air connection 29 are closed by the plug.

Figure 4:
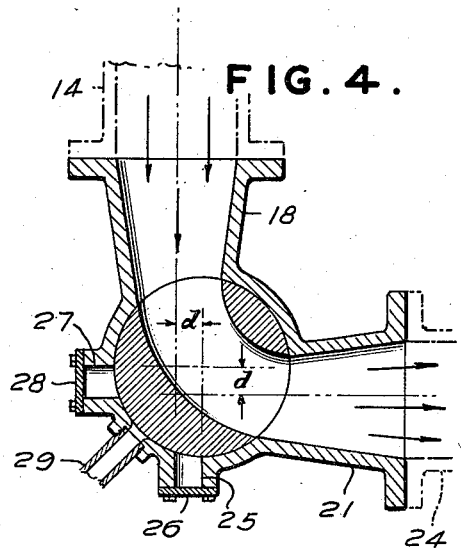
Fig. 4 is a similar cross-section of the valve when open.
Figure 5:
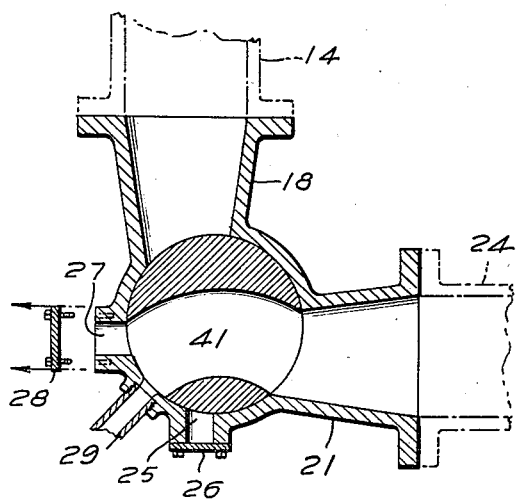

In order to establish the aforementioned clean-out positions of the valve plug, the plug may be turned from its Fig. 4 position clockwise through a larger arc until it reaches the Fig. 5 position, in which one end of the port 41 registers with the outlet connection 21, while the other end of the port registers with the opening 27, as well as with the compressed air connection 29. The cover 28 is shown to be removed from the opening 27, to indicate that a cleaning rod can be introduced through the opening 27 and by way of the port 41 into the sludge discharge connection 24 as far as is possible or required in order to remove a congestion therein. The very movement of the valve plug 17 which establishes this cleanout position for the discharge side of the valve, also closes the inlet connection 18, thereby making unnecessary any extra closure means. If the valve plug 17 is further turned in a clockwise direction from its Fig. 5, to its Fig. 6 position until the port 41 registers with the outlet connection 18, then the port 41 will also have made connection with the opening 25, as well as with the compressed air connection 29. Again, the opening 25 lines up with the port 41 and with the inlet connection 18, permitting a cleaning rod to be introduced from the outside through the valve upwardly into the inlet connection for breaking up any possible congestion therein, while the outlet connection 21 is properly shut off by the body of the valve plug 17.

Figure 6:
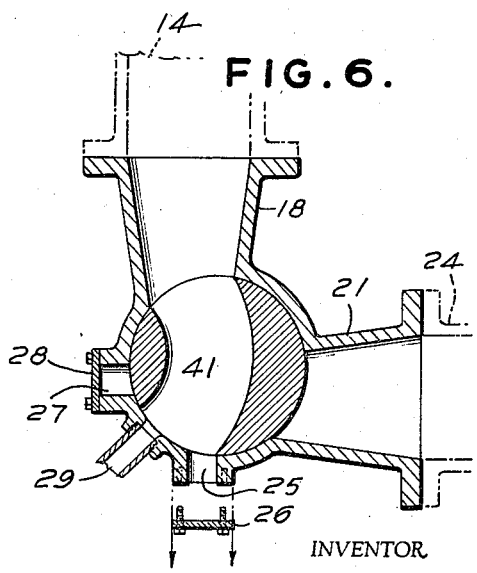
Fig. 6 is a similar cross-section of the valve, showing the valve plug in the other clean-out position.

Referring to Fig. 5 and Fig. 6, respectively, it will also be seen if the covers 26 and 28 remain closed upon their respective openings 25 and 27, that the identical compressed air connection 29 may be used in each clean-out position of the valve plug to blow out either the outlet connection 21 and the sludge discharge pipe 24 (see Fig. 5) while the inlet connection 18 is properly closed, or to blow out (see Fig. 6), the inlet connection 18, the reduction piece 14 and the outlet portion 10 of the thickener bottom, while outlet connection 21 is properly closed.

In view of the foregoing description and in view of the figures, particularly Figures 3–5, the function and the operation of the valve are substantially self-explanatory. It will be noted, however (see Fig. 4), that the center of the inlet connection 18, as well as the center of the outlet connection 21 are each set a distance $d$ off the center of the plug 17. This makes it possible to provide a port 41 that connects with or merges into the inlet and outlet connection respectively in a relatively shallow curve whereby the resistance of the round-the-corner flow of the sludge through the valve is relatively reduced. Otherwise, that is if the center lines of the inlet and outlet connection were to intersect in the center of the plug 17, this would require a relatively larger diameter plug for obtaining an equally flat round-the-corner flow through the valve.

The Figures 5 and 6 illustrate the cleaning out features as they appear in the respective cleanout positions of the plug. A cleaning rod (not shown) may be inserted through the respective cleanout openings 25 or 27, through the port 41 in its respective cleanout position, into the outlet connection 21 (see Figure 5) or the inlet connection 18 (see Fig. 6), respectively, each of these cleanout positions making one of the connections 18 or 21 accessible through the port 41 while the other is closed by the plug. The connection 29 serves as a common source of a pressure fluid such as compressed air or high pressure water supply for both cleanout positions of the plug 17, that is to say for blowing out the outlet connection 21 (see Fig. 5), as well as the inlet connection Fig. 6. When blowing out in the Fig. 5 position of the port it will be understood that the cleaning opening 27 would have to remain closed as by cover 28, while when blowing out the inlet connection 18 in the Fig. 6 position of the plug 17, the cleaning opening 25 would have to remain closed as by its cover 26.

I claim:

1. A plug type valve comprising a valve housing having an inlet connection and outlet connection disposed at an angle with respect to each other, and having a common compressed air connection for and substantially opposite both said connections, a rotatable plug operatively seated in said valve housing and having a transverse port, and being turnable to normally open and close the valve while said compressed air connection is being kept closed by said plug, and also turnable to one cleanout position in which the port registers with the outlet connection while the inlet connection is closed by the plug, and to another cleanout position in which the port registers with the inlet connection while the outlet connection is closed by said plug, said compressed air connection registering with said port in both cleanout positions thereof.

2. A plug type valve comprising a valve housing having an inlet connection and an outlet connection disposed at an angle with respect to each other, and having one clean-out opening outside said angle and substantially opposite to and associated with said inlet connection, another clean-out opening outside said angle and substantially opposite to and associated with said outlet connection, a rotatable plug operatively seated in said valve housing and having a transverse port, and being turnable to normally open and close the valve, and also turnable to one clean-out position whereby one end of the port registers with said first-mentioned clean-out opening and the other end of the port registers with said inlet connection, said plug being furthermore turnable to another clean-out position whereby one end of the port registers with said other clean-out opening and the other end of the port registers with said outlet connection, each clean-out opening together with the associated connection and said port constituting a passage adapted for the introduction therethrough of a cleaning instrument while the other connection is closed by said plug.

3. A valve according to claim 2, with the addition of a connection for pressure fluid provided on said valve housing substantially opposite to said connections and so as to register with the port in either clean-out position thereof.

4. A valve according to claim 2, in which both clean-out openings are closed by the plug when the valve is open.

5. A valve according to claim 2, in which one clean-out opening is closed by the plug in one clean-out position thereof while the other opening registers with the port, and vice versa.

6. A plug type valve comprising a valve housing having an inlet connection and an outlet connection disposed at an angle with respect to each other, and having clean-out opening means outside said angle and substantially opposite to said inlet and outlet connections, a rotatable plug operatively seated in said valve housing and having a transverse port, and being turnable to normally open and close the valve, and also turnable to one clean-out position whereby one end of said port registers with said clean-out opening means and the other end of the port registers with said inlet connection, said plug being furthermore turnable to another clean-out position whereby one end of the port registers with said clean-out opening means and the other end of the port registers with said outlet connection, said clean-out opening means together with each of said inlet and outlet connections at a time constituting a passage, one connection being open while the other connection is closed by said plug.

CHARLES H. SCOTT.